(12) United States Patent
Lee

(10) Patent No.: US 9,386,301 B2
(45) Date of Patent: Jul. 5, 2016

(54) STEREOSCOPIC DISPLAY SYSTEM

(75) Inventor: Chia-Yu Lee, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 317 days.

(21) Appl. No.: 13/639,447

(22) PCT Filed: Jun. 8, 2012

(86) PCT No.: PCT/CN2012/076658
§ 371 (c)(1),
(2), (4) Date: Oct. 4, 2012

(87) PCT Pub. No.: WO2013/181844
PCT Pub. Date: Dec. 12, 2013

(65) Prior Publication Data
US 2013/0329022 A1 Dec. 12, 2013

(30) Foreign Application Priority Data
Jun. 7, 2012 (CN) .......................... 2012 1 0185377

(51) Int. Cl.
*H04N 13/04* (2006.01)
(52) U.S. Cl.
CPC ....... *H04N 13/0434* (2013.01); *H04N 13/0468* (2013.01)
(58) Field of Classification Search
CPC .......... H04N 13/0468; H04N 13/0434; H04N 13/044; H04N 13/0497; H04N 13/0059; H04N 13/0402; H04N 13/0429; H04N 13/0232; H04N 13/0431; G02B 27/017; G02B 27/0172
USPC .......................................................... 348/53
See application file for complete search history.

(56) References Cited

U.S. PATENT DOCUMENTS

| | | | | |
|---|---|---|---|---|
| 2005/0207486 | A1* | 9/2005 | Lee et al. | 375/240.01 |
| 2006/0114415 | A1* | 6/2006 | Shestak | G02B 27/2214 353/7 |
| 2008/0204874 | A1* | 8/2008 | Kim | G02B 27/2214 359/465 |
| 2008/0231952 | A1* | 9/2008 | Kim | G02B 27/2214 359/465 |
| 2009/0009592 | A1* | 1/2009 | Takata | G02B 27/2214 348/47 |
| 2009/0109127 | A1* | 4/2009 | Chang | G02B 27/2214 345/6 |
| 2009/0185138 | A1* | 7/2009 | Kubara | 353/8 |
| 2010/0118117 | A1* | 5/2010 | Kroll | G03H 1/02 348/40 |
| 2011/0032346 | A1* | 2/2011 | Kleinberger | 348/59 |
| 2011/0187832 | A1* | 8/2011 | Yoshida | 348/46 |
| 2011/0193814 | A1* | 8/2011 | Gay et al. | 345/173 |
| 2011/0199549 | A1* | 8/2011 | Washizawa | 349/15 |
| 2011/0242098 | A1* | 10/2011 | Tamaru | 345/419 |
| 2012/0062990 | A1* | 3/2012 | Okamoto | 359/463 |

(Continued)

*Primary Examiner* — Shan Elahi
(74) *Attorney, Agent, or Firm* — Mark M. Friedman

(57) ABSTRACT

The present invention discloses a stereoscopic display system, which includes a phase retarder, a display panel, a detector unit, and a processing unit. The phase retarder has a plurality of first strip shapes and a plurality of second strip shapes. The first strip shapes and the second strip shapes are alternately arranged. The display panel has a plurality of pixels. The pixels are arranged into a plurality of pixel rows corresponding to the first strip shapes and the second strip shapes. The detector unit utilized to detect a position of an observer's eyes relative to the display panel. The processing unit is electrically coupled to the display panel and the detector unit, and is utilized to adjust a position of the images displayed on the plurality of pixel rows, thereby reducing a crosstalk phenomenon.

11 Claims, 8 Drawing Sheets

(56) References Cited

U.S. PATENT DOCUMENTS

| | | | |
|---|---|---|---|
| 2012/0069143 A1* | 3/2012 | Chu | 348/43 |
| 2012/0120035 A1* | 5/2012 | Yang | G09G 3/3614 345/205 |
| 2012/0120331 A1* | 5/2012 | Oka et al. | 349/15 |
| 2012/0140038 A1* | 6/2012 | Bi | H04N 13/0022 348/46 |
| 2012/0147281 A1* | 6/2012 | Matsuhiro | G02B 27/26 349/15 |
| 2012/0154381 A1* | 6/2012 | Chen et al. | 345/419 |
| 2012/0225216 A1* | 9/2012 | Wu | G02B 27/2214 427/555 |
| 2012/0236411 A1* | 9/2012 | Wu | 359/492.01 |
| 2013/0300958 A1* | 11/2013 | Matsuhiro | G02B 27/26 349/15 |
| 2014/0043534 A1* | 2/2014 | Nakaoka | 348/563 |

* cited by examiner

FIG. 2 (Prior art)

STEREOSCOPIC DISPLAY SYSTEM

FIELD OF THE INVENTION

The present invention relates to a display system, and especially to a stereoscopic (three dimensional) display system.

BACKGROUND OF THE INVENTION

With the rapid development of display technology in recent years, stereoscopy is an important developing trend. A stereoscopic display typically consists of a liquid crystal display (LCD) panel and micro-optical components (e.g. parallax barriers or a patterned phrase retarder). The LCD panel displays a left eye image and a right eye image on corresponding pixels. The role of the micro-optical components is to control the left eye image only being seen by a left eye of a viewer and the right eye image only being seen by a right eye of the viewer. When the left and right eyes of the viewer respectively receive the suitable left eye image and the suitable right eye image, the images fuse in the brain of the viewer and the viewer senses stereoscopic vision.

Referring to FIG. 1, FIG. 1 is a schematic drawing illustrating a conventional stereoscopic display that adopts a patterned phrase retarder. The conventional stereoscopic display 100 includes a patterned phrase retarder 110 and an LCD panel 120. The patterned phrase retarder 110 has a plurality of first strip shapes 112 and a plurality of second strip shapes 114. The first strip shapes 112 and the second strip shapes 114 are alternately arranged. Phase retardation of the first strip shape 112 is different from that of the second strip shape 114, so that light passing through the first strip shape 112 and the second strip shape 114 has different polarization states. Corresponding glasses 140 having specific polarization directions are utilized to respectively receive the left and right eye images L and R, thereby achieving an effect of displaying stereoscopic images.

However, as shown in FIG. 1, a small proportion of the right eye image R may enter a left eye lens 142 when in actual use. Similarly, a small proportion of the left eye image L may enter a right eye lens 144, too. Accordingly, this causes a crosstalk phenomenon in the images, then influencing a 3D viewing effect of the viewer.

Referring to FIG. 2, FIG. 2 is a schematic drawing illustrating a sub pixel array of a conventional tri-gate LCD panel. Moreover, in order to reduce cost of data driving chips (source IC), a tri-gate LCD panel for reducing the number of data driving chips has been proposed. As shown in FIG. 2, the so-called tri-gate LCD panel means that an arrangement of sub pixels in each of pixel rows (row 1, row 2, . . . ) becomes a vertical arrangement (as shown in FIG. 2) from a well-know horizontal arrangement, so that the number of gate lines along a horizontal direction become triple.

Referring to FIG. 3, FIG. 3 is a schematic drawing illustrating a conventional stereoscopic display that adopts the tri-gate LCD panel with the patterned phrase retarder. However, while a combination of the conventional tri-gate LCD panel 220 and the patterned phrase retarder 110 serves as a stereoscopic display, correct pixel rows for respective eyes can be seen in facing squarely (position II in the drawing) in consideration of a viewing angle. However, when the viewing angle becomes large (e.g. positions I or III in the drawing), the sub pixels for another eye are seen by the respective eyes due to the large viewing angles. Using the viewing angle (I) as an example, the sub pixels of a first color (e.g. blue) for one eye can not be seen gradually, but the sub pixels of the first color for another eye appear gradually; thus, the crosstalk phenomenon is caused.

SUMMARY OF THE INVENTION

An objective of the present invention is to provide a stereoscopic display system, which can decrease the crosstalk phenomenon occurring in the conventional stereoscopic display to further raise the 3D viewing effect.

To achieve the foregoing objective, a stereoscopic display system provided by the present invention includes a phase retarder, a display panel, a detector unit, and a processing unit. The phase retarder has a plurality of first strip shapes and a plurality of second strip shapes. The first strip shapes and the second strip shapes are alternately arranged. The display panel has a plurality of pixels. The pixels are arranged into a plurality of pixel rows corresponding to the first strip shapes and the second strip shapes. The detector unit utilized to detect a position of an observer's eyes relative to the display panel. The processing unit is electrically coupled to the display panel and the detector unit, and is utilized to adjust a position of the images displayed on the plurality of pixel rows.

In the stereoscopic display system of one preferred embodiment, the display panel is a tri-gate LCD panel. Specifically, each of the pixels comprises a first sub pixel, a second sub pixel, and a third sub pixel, and the first sub pixel, second sub pixel, and third sub pixel are arranged from top to bottom along a vertical direction.

In the embodiment, the detector unit is a camera utilized to identify the position of the observer's eyes relative to a center of the display panel. For example, the processing unit adjusts the pixels into a first mode when the position is higher than a predetermined distance away from the center of the display panel. The processing unit adjusts the pixels into a second mode when the position is lower than a predetermined distance away from the center of the display panel. Furthermore, in the first mode, an image displayed by the first sub pixels in each of the pixel rows is shifted to the first sub pixels in a next pixel row to be displayed. In the second mode, an image displayed by the third sub pixels in each of the pixel rows is shifted to the third sub pixels in a previous pixel row to be displayed.

In the stereoscopic display system of another preferred embodiment, the stereoscopic display system further includes a pair of polarized glasses. The pair of polarized glasses is utilized to make the observer's left and right eyes respectively see different images. The detector unit herein detects a relative position of the pair of polarized glasses for obtaining the position of the observer's eyes relative to the display panel. Specifically, the detector unit includes a receiver, and the pair of polarized glasses comprises a transmitter. The transmitter generates a message to the receiver for obtaining the relative position.

In comparison with the prior art, because the detector unit is capable of detecting the position of the observer's eyes so as to adjust the position of the images displayed on the pixel rows, the suitable images can substantially correspond to the observer's eyes, thereby reducing the crosstalk phenomenon. Moreover, as to the stereoscopic display system implemented by the tri-gate LCD panel, there is a more serious crosstalk phenomenon because the arrangement of the sub pixels is in the vertical direction. However, the processing unit of the present invention can control the images arranged on the sub pixels for decreasing the crosstalk phenomenon, thereby raising the 3D viewing effect.

It is to be understood that both the foregoing general description and the following detailed description of the present invention are exemplary and explanatory and are intended to provide further explanation of the invention as claimed.

DESCRIPTION OF THE DRAWINGS

Figure 2:
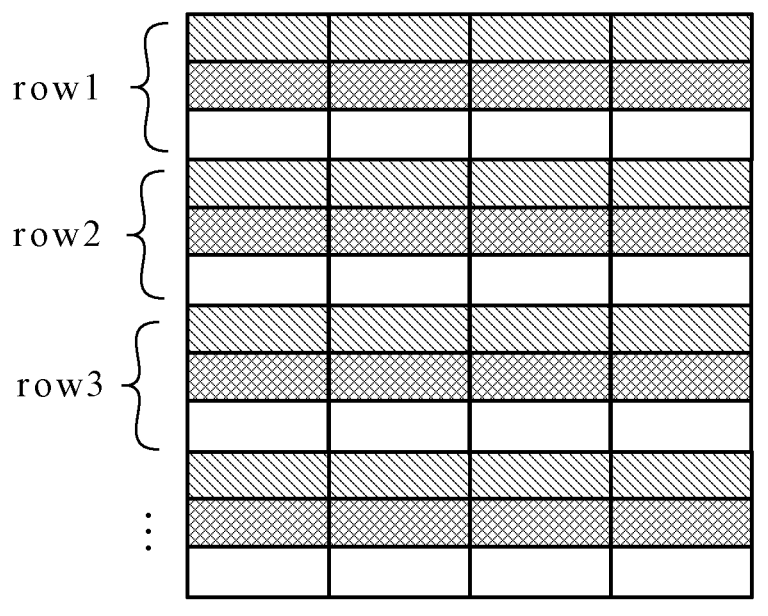

FIG. 2 is a schematic drawing illustrating sub pixel array of a conventional tri-gate LCD panel;

DETAILED DESCRIPTION OF THE PREFERRED EMBODIMENTS

Descriptions of the following embodiments refer to attached drawings which are utilized to exemplify specific embodiments.

Figure 1:
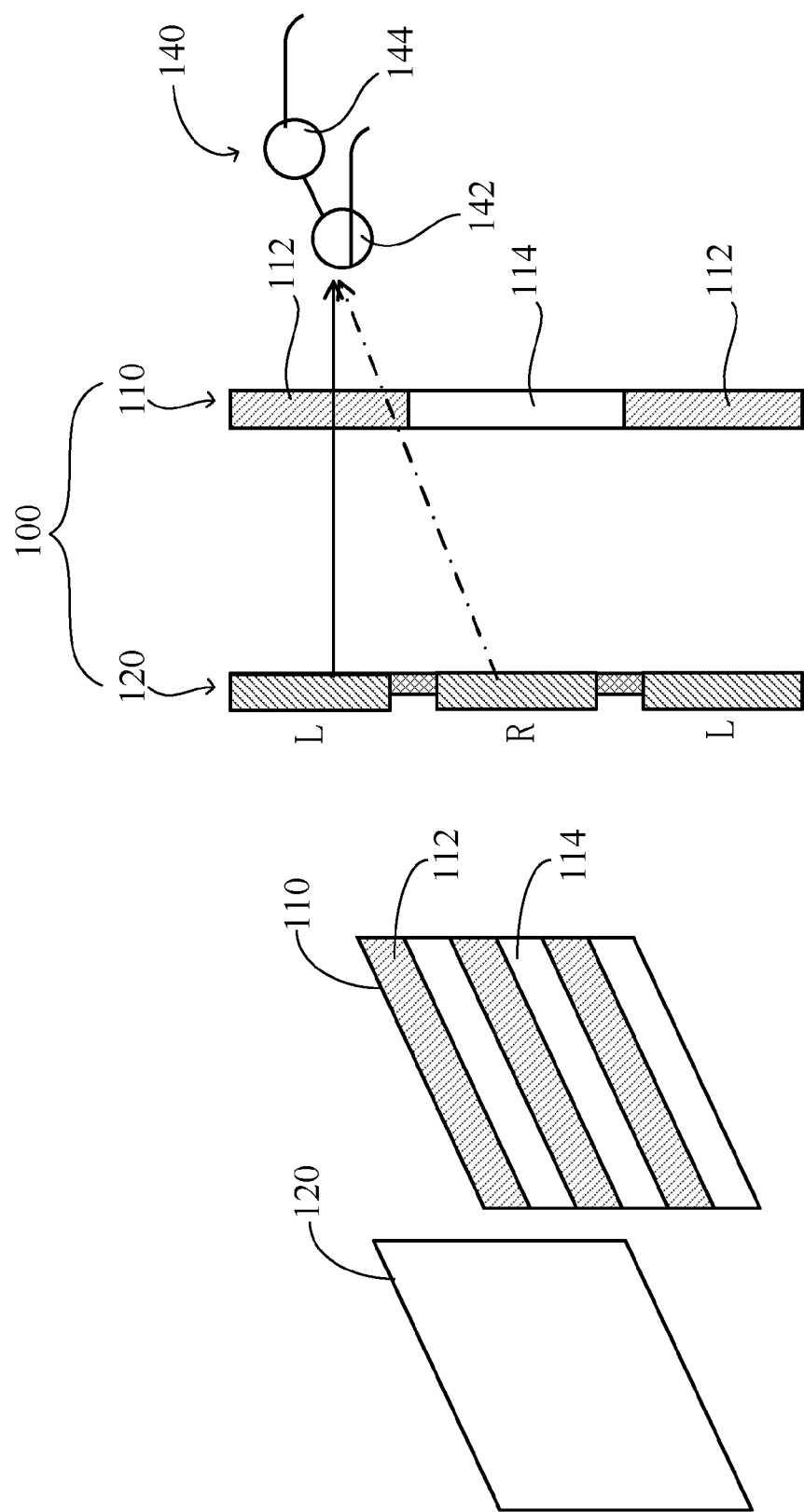
FIG. 1 is a schematic drawing illustrating a conventional stereoscopic display adopting a patterned phrase retarder.
Figure 3:
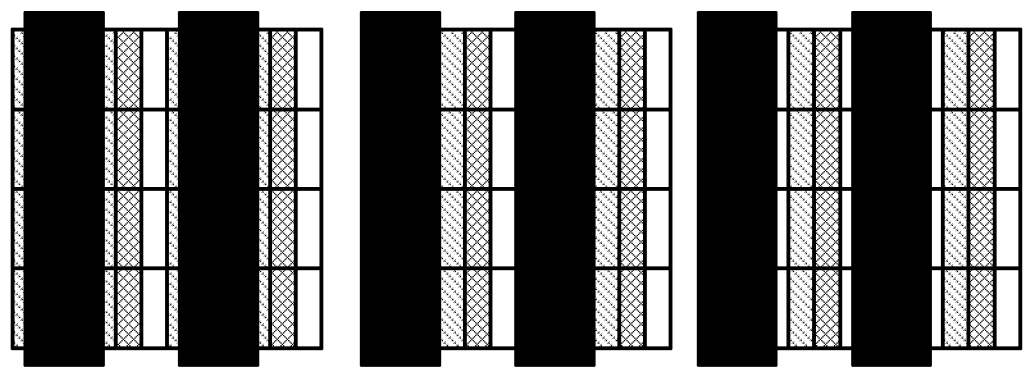
FIG. 3 is a schematic drawing illustrating a conventional stereoscopic display that adopts the tri-gate LCD panel with the patterned phrase retarder.
Figure 3:
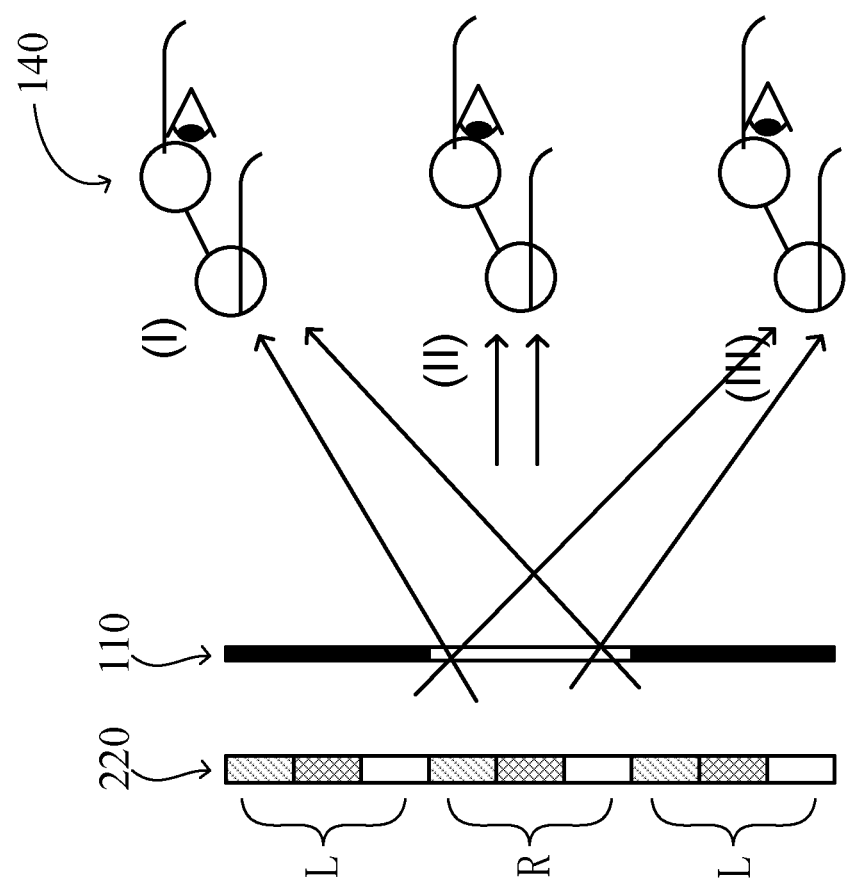
Figure 4:
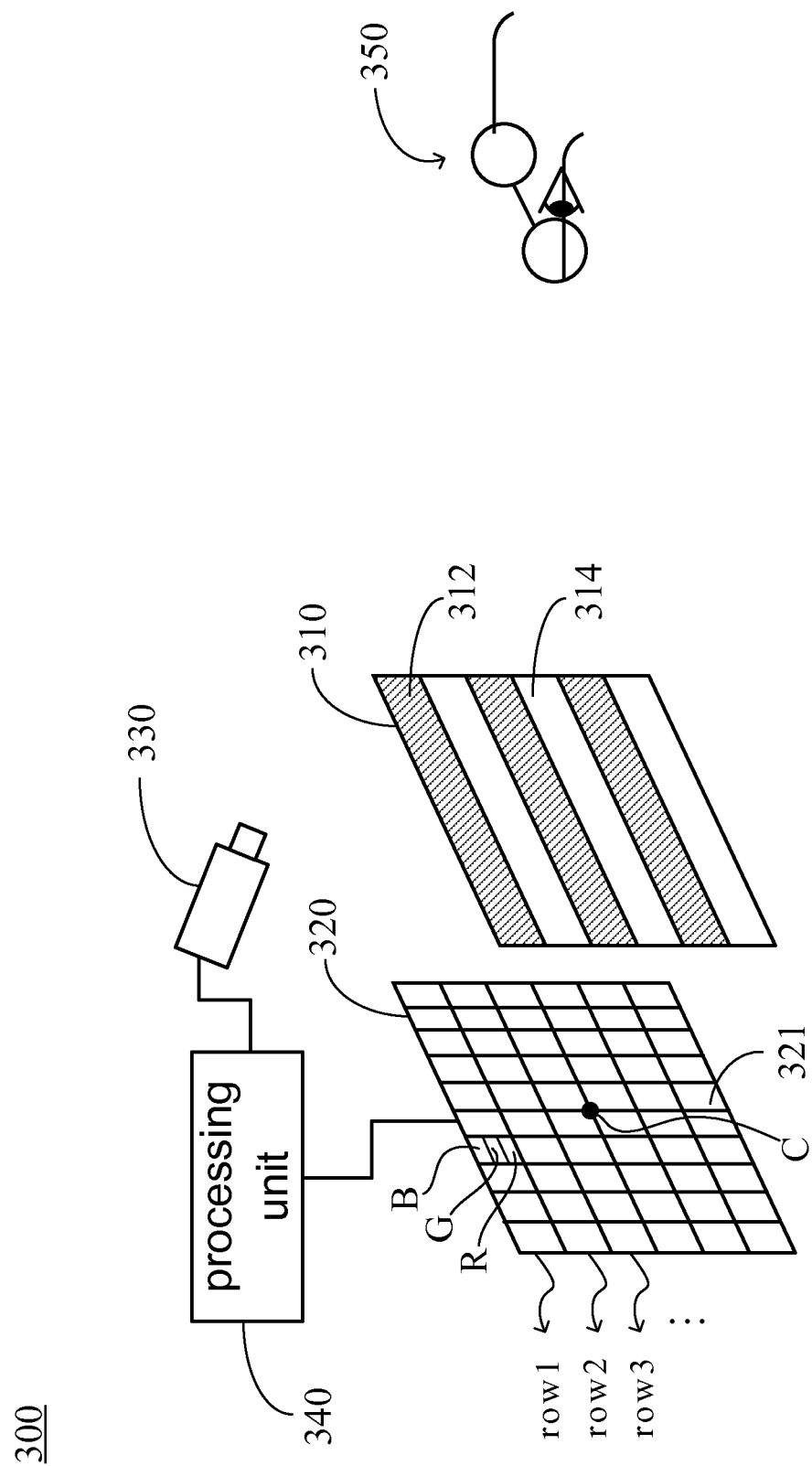
FIG. 4 is a schematic drawing illustrating a stereoscopic display system according to one preferred embodiment of the present invention.

Referring to FIG. 4, FIG. 4 is a schematic drawing illustrating a stereoscopic display system according to one preferred embodiment of the present invention. The stereoscopic display system 300 of the preferred embodiment of the present invention includes a phase retarder 310, a display panel 320, a detector unit 330, a processing unit 340, and a pair of polarized glasses 350. The phase retarder 310 has a plurality of first strip shapes 312 and a plurality of second strip shapes 314. The first strip shapes 312 and the second strip shapes 314 are alternately arranged along a vertical direction. In the embodiment, the first strip shapes 312 and the second strip shapes 314 are parallel to a horizontal direction. However, in other embodiments, the first strip shapes and the second strip shapes can be parallel to the vertical direction. That is, the first strip shapes 212 and the second strip shapes 214 are alternately arranged along the horizontal direction. Specifically, the phase retarder 310 is a quarter-wave array plate. Moreover, there is a 45-degree angle between a direction of an optical axis in the first strip shapes 312 of the quarter-wave array plate and the horizontal direction, also there is a 135-degree angle between a direction of an optical axis in the second strip shapes 314 of the quarter-wave array plate and the horizontal direction. The pair of polarized glasses 350 is utilized to make the observer's left and right eyes respectively see different images.

Referring to FIG. 4 again, the display panel 320 has a plurality of pixels 321. The pixels 321 are arranged into a plurality of pixel rows, row 1 to row N, corresponding to the first strip shapes 312 and the second strip shapes 314. In the embodiment, odd number rows (row 1, row 3, . . . ) of the pixel rows correspond to the plurality of first strip shapes 212, and even number rows (row 2, row 4, . . . ) of the pixel rows correspond to the plurality of second strip shapes 214. In addition, the image given by the odd number rows of the pixel rows is defined as a left eye image L, and the image given by the even number rows of the pixel rows is defined as a right eye image R.

In the preferred embodiment, the display panel 320 is a tri-gate LCD panel. As shown in the drawing, each of the pixels 321 includes a first sub pixel B, a second sub pixel G, and a third sub pixel R, and the first sub pixel B, second sub pixel G, and third sub pixel R are arranged from top to bottom along the vertical direction.

The detector unit 330 is utilized to detect a position of an observer's eyes relative to the display panel 320. In the preferred embodiment, the detector unit 330 is a camera, which is utilized to identify the position of the observer's eyes relative to a center C of the display panel 320. Specifically, the camera can obtain the relative position of the observer's eyes by trigonometric measurement. However, the present invention is not limited to be implemented in trigonometric measurement, and other measurements are also within the scope of the present invention. The processing unit 340 is electrically coupled to the display panel 320 and the detector unit 330. After the detector unit 330 computes the relative position of the observer's eyes, the detector unit 330 generates a position message to the processing unit 340 for performing determination. The following will explain determining processes of the processing unit 340 in detail.

Figure 5:
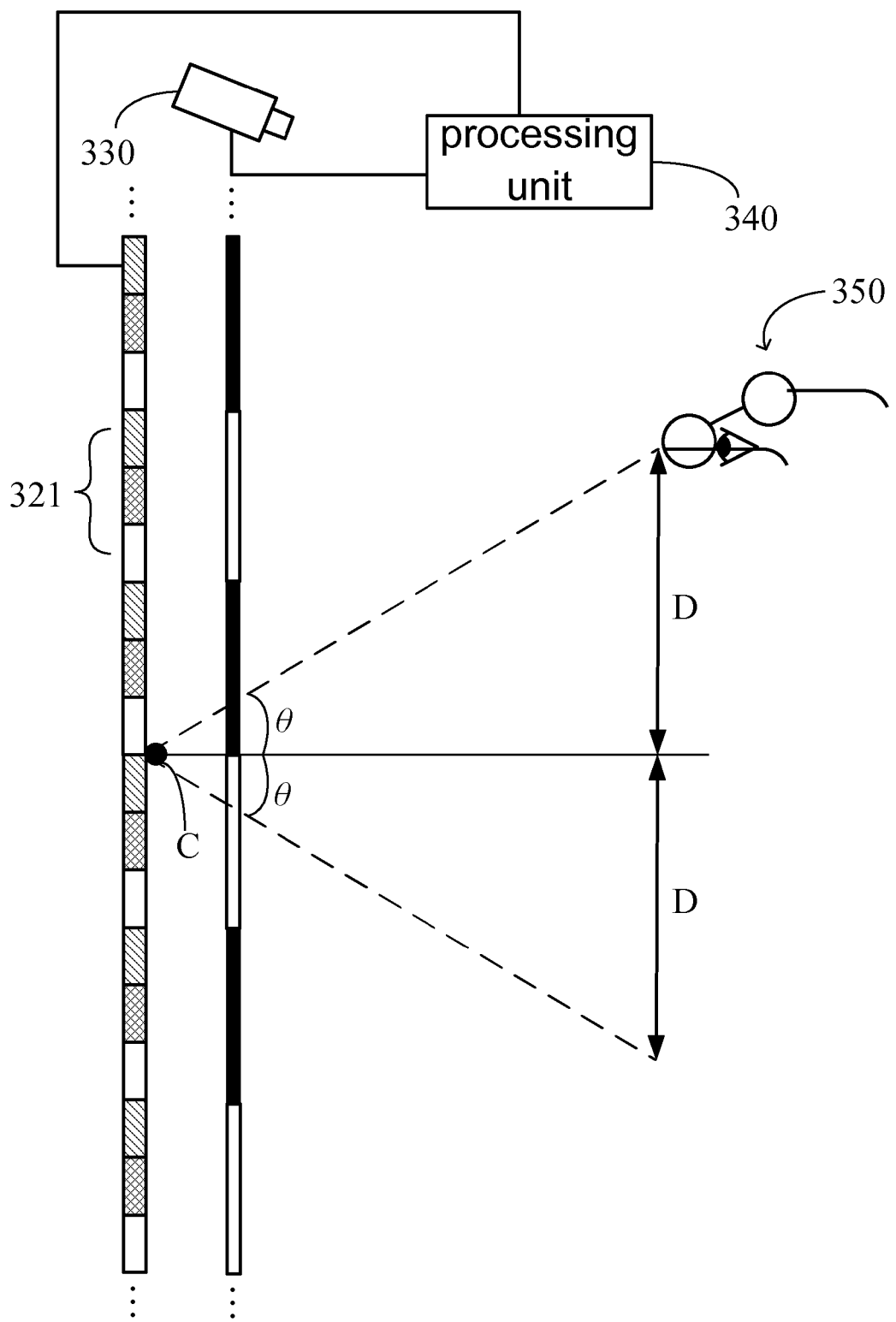
FIG. 5 is a side view schematically illustrating the stereoscopic display system of the embodiment.

Referring to FIG. 5, FIG. 5 is a side view schematically illustrating the stereoscopic display system of the embodiment. When the position is higher than a predetermined distance D away from the center C of the display panel, the processing unit 340 adjusts the pixels 321 into a first mode. However, the present invention also be implemented by the following. When an angle of the position is larger than a predetermined angle θ relative to the center C of the display panel, the processing unit 340 adjusts the pixels 321 into the first mode. Similarly, when the position is lower than the predetermined distance D away from the center C of the display panel, the processing unit 340 adjusts the pixels 321 into a second mode. Likewise, the present invention also is implemented by the following. When the angle of the position is smaller than a predetermined angle θ relative to the center C of the display panel, the processing unit 340 adjusts the pixels 321 into the second mode. The following will respectively explain the first mode and the second mode.

Figure 6:
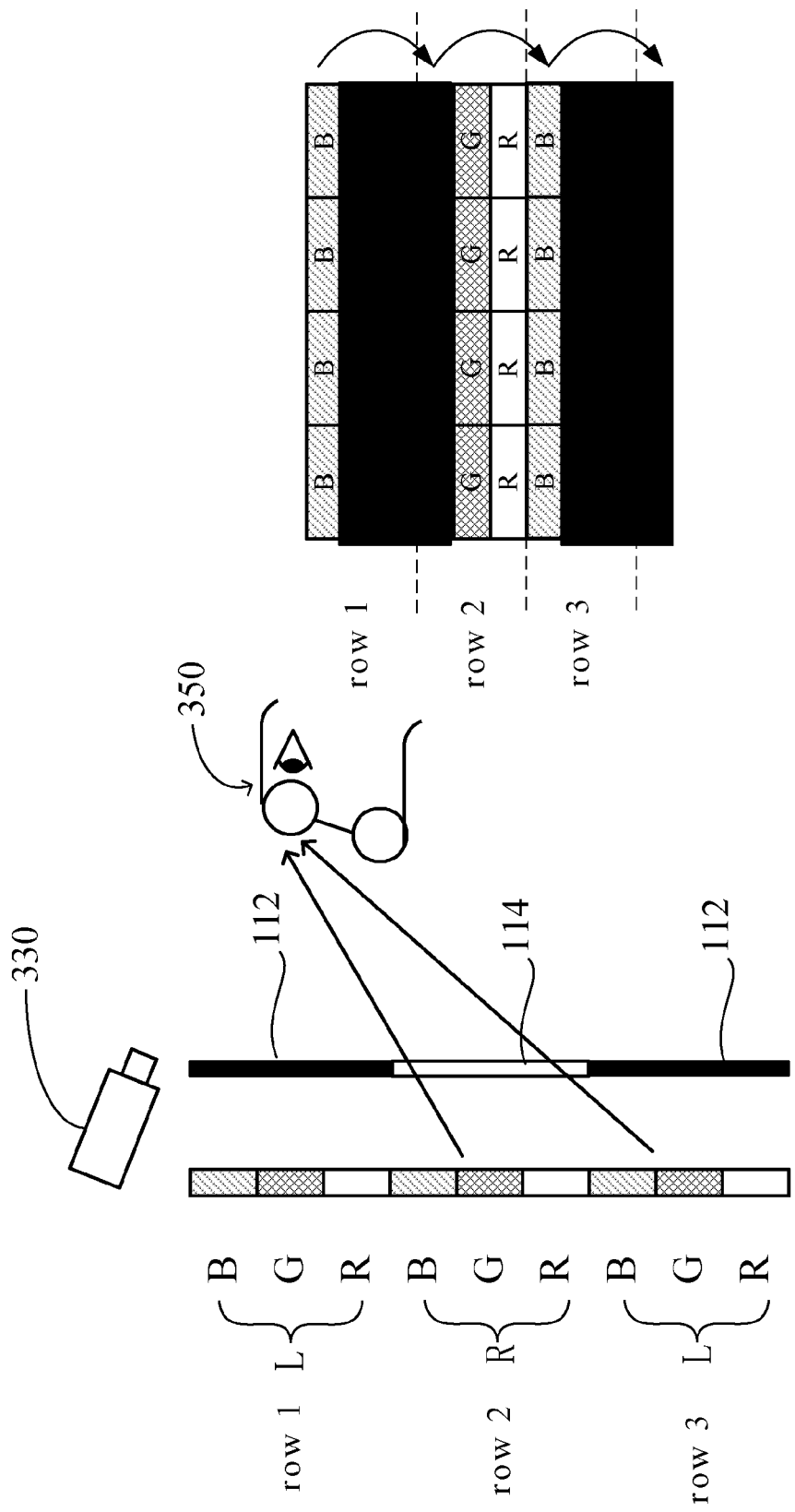
FIG. 6 is a side view schematically illustrating the stereoscopic display system in a first mode.

Referring to FIG. 6, FIG. 6 is a side view schematically illustrating the stereoscopic display system in a first mode. The first mode represents the observer's eyes being higher than the predetermined distance D, so the observer's right eye will see the first sub pixels B of the left eye image L in row 3. Therefore, the processing unit 340 adjusts the display panel 320 for the image displayed by the first sub pixels B in each of the pixel rows (e.g. row 2) being shifted to the first sub pixels B in a next pixel row (e.g. row 3) to be displayed. As a result, the observer's right eye can see the complete right eye image in row 2.

Figure 7:
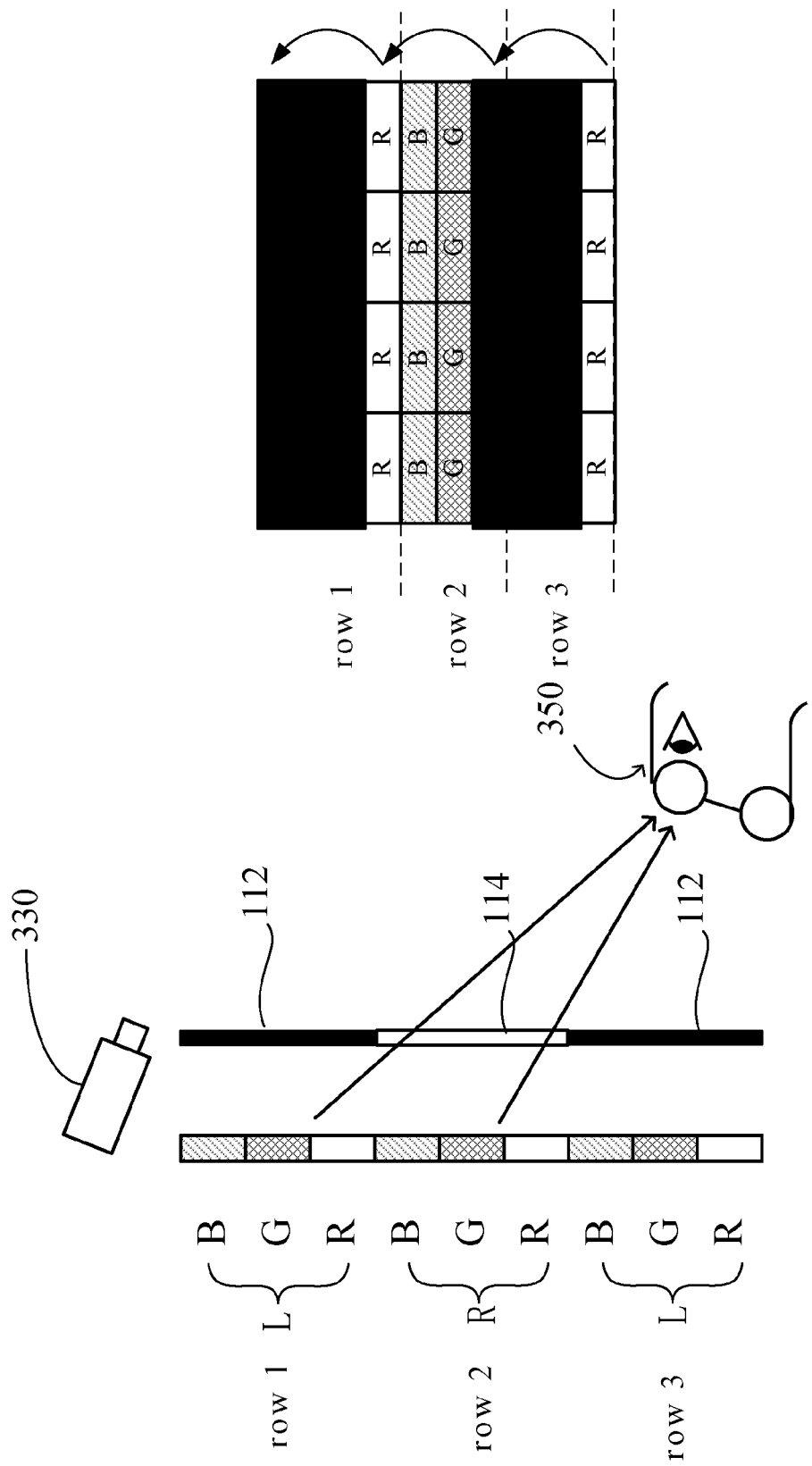
FIG. 7 is a side view schematically illustrating the stereoscopic display system in a second mode.

Similarly, referring to FIG. 7, FIG. 7 is a side view schematically illustrating the stereoscopic display system in a second mode. The second mode represents the observer's eyes being lower than the predetermined distance D, so the observer's right eye will see the third sub pixels R of the left eye image L in row 1. Therefore, the processing unit 340 adjusts the display panel 320 for the image displayed by the third sub pixels R in each of the pixel rows (e.g. row 2) being shifted to the third sub pixels R in a previous pixel row (e.g. row 1) to be displayed. As a result, the observer's right eye can see the complete right eye image in row 2.

As mentioned above, because the detector unit 330 is capable of detecting the position of the observer's eyes so as to adjust the position of the images displayed on the pixel rows, the suitable images can substantially correspond to the observer's eyes, thereby reducing the crosstalk phenomenon.

Figure 8:
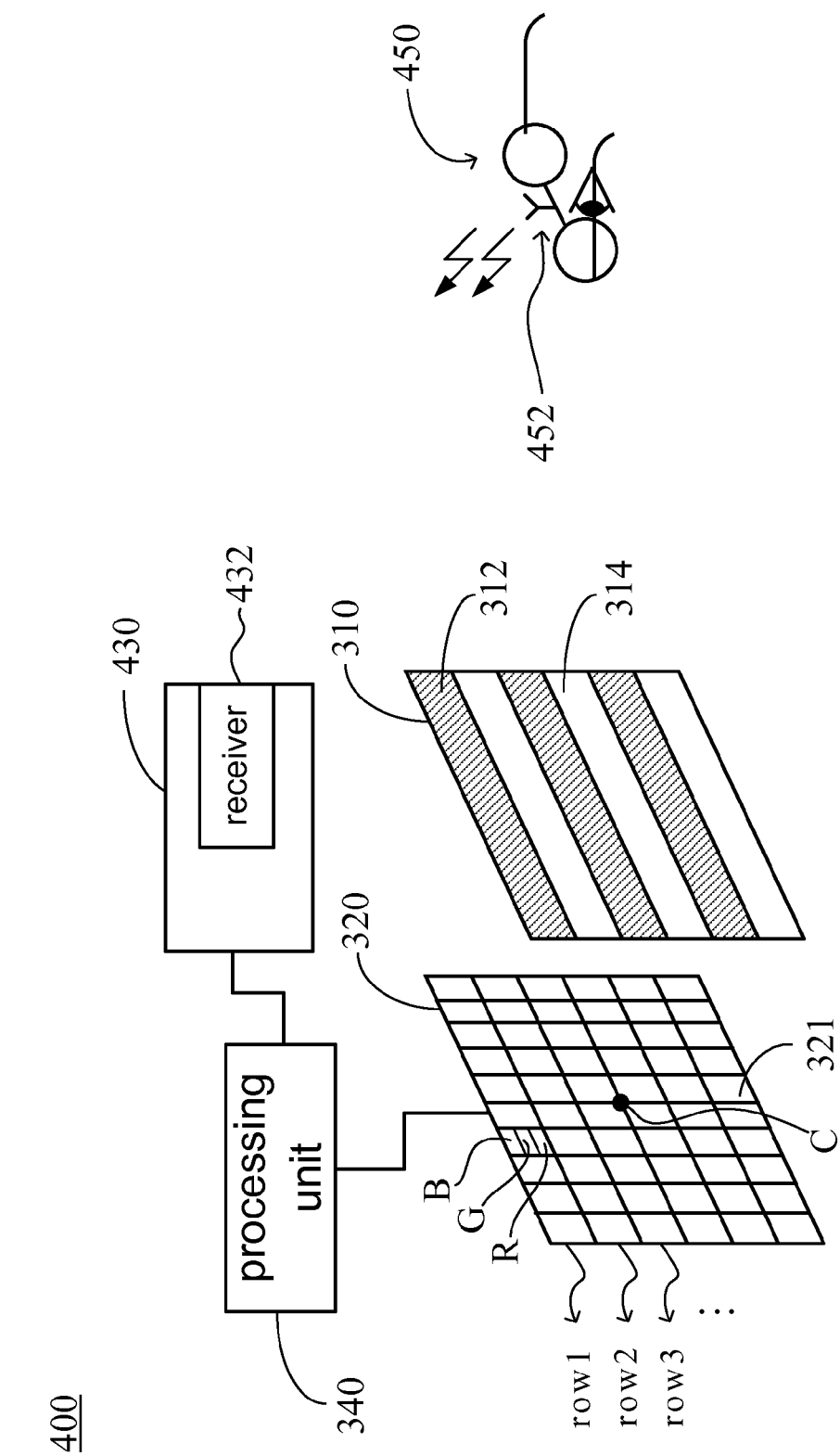
FIG. 8 is a schematic drawing illustrating a stereoscopic display system according to another preferred embodiment of the present invention.

Referring to FIG. 8, FIG. 8 is a schematic drawing illustrating a stereoscopic display system according to another preferred embodiment of the present invention. The difference between the embodiment and the previous embodiment is the detector unit 430 and a pair of polarized glasses 450. The detector unit 430 detects a relative position of the pair of polarized glasses 450 for obtaining the position of the observer's eyes relative to the display panel 320. Specifically, the detector unit 430 includes a receiver 432, and the pair of polarized glasses 450 includes a transmitter 452. The transmitter 452 generates a message to the receiver 432 for obtaining the relative position. Besides, in other embodiments, the detector unit 430 can also be implemented by including a transceiver.

In summary, because the detector unit is capable of detecting the position of the observer's eyes so as to adjust the position of the images displayed on the pixel rows, the suitable images can substantially correspond to the observer's eyes, thereby reducing the crosstalk phenomenon. Moreover, as to the stereoscopic display system implemented by the tri-gate LCD panel, there is a more serious crosstalk phenomenon because the arrangement of the sub pixels is in the vertical direction. However, the processing unit of the present invention can control the images arranged on the sub pixels for decreasing the crosstalk phenomenon, thereby raising the 3D viewing effect.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A stereoscopic display system, comprising:
    a phase retarder having a plurality of first strip shapes and a plurality of second strip shapes, the first strip shapes and the second strip shapes alternately arranged;
    a tri-gate LCD panel having a plurality of pixels, the pixels arranged into a plurality of pixel rows corresponding to the first strip shapes and the second strip shapes;
    a detector module utilized to detect a position of an observer's eyes relative to the display panel, wherein the detector module is a camera utilized to identify the position of the observer's eyes relative to a center of the display panel;
    a pair of polarized glasses utilized to make the observer's left and right eyes respectively see different images; and
    a processing module, electrically coupled to the display panel and the detector module, utilized to adjust a position of the images displayed on the plurality of pixel rows, wherein the processing module adjusts the pixels into a first mode when the position is higher than a predetermined distance away from the center of the display panel, and the processing module adjusts the pixels into a second mode when the position is lower than a predetermined distance away from the center of the display panel.

2. The stereoscopic display system according to claim 1, wherein in the first mode, an image displayed by the first sub pixels in each of the pixel rows is shifted to the first sub pixels in a next pixel row to be displayed.

3. The stereoscopic display system according to claim 1, wherein in the second mode, an image displayed by the third sub pixels in each of the pixel rows is shifted to the third sub pixels in a previous pixel row to be displayed.

4. A stereoscopic display system, comprising:
    a phase retarder having a plurality of first strip shapes and a plurality of second strip shapes, the first strip shapes and the second strip shapes alternately arranged;
    a display panel having a plurality of pixels, the pixels arranged into a plurality of pixel rows corresponding to the first strip shapes and the second strip shapes;
    a detector module utilized to detect a position of an observer's eyes relative to the display panel, wherein the detector module is a camera utilized to identify the position of the observer's eyes relative to a center of the display panel; and
    a processing module, electrically coupled to the display panel and the detector module, utilized to adjust a position of the images displayed on the plurality of pixel rows, wherein the processing module adjusts the pixels into a first mode when the position is higher than a predetermined distance away from the center of the display panel, and the processing module adjusts the pixels into a second mode when the position is lower than a predetermined distance away from the center of the display panel.

5. The stereoscopic display system according to claim 4, wherein the display panel is a tri-gate LCD panel.

6. The stereoscopic display system according to claim 5, wherein each of the pixels comprises a first sub pixel, a second sub pixel, and a third sub pixel, and the first sub pixel, second sub pixel, and third sub pixel are arranged from top to bottom along a vertical direction.

7. The stereoscopic display system according to claim 4, wherein in the first mode, an image displayed by the first sub pixels in each of the pixel rows is shifted to the first sub pixels in a next pixel row to be displayed.

8. The stereoscopic display system according to claim 4, wherein in the second mode, an image displayed by the third sub pixels in each of the pixel rows is shifted to the third sub pixels in a previous pixel row to be displayed.

9. The stereoscopic display system according to claim 4, wherein the stereoscopic display system further comprises a pair of polarized glasses, the pair of polarized glasses utilized to make the observer's left and right eyes respectively see different images.

10. The stereoscopic display system according to claim 9, wherein the detector module detects a relative position of the pair of polarized glasses for obtaining the position of the observer's eyes relative to the display panel.

11. The stereoscopic display system according to claim 10, wherein the detector module comprises a receiver, and the pair of polarized glasses comprises a transmitter, the transmitter generates a message to the receiver for obtaining the relative position.

* * * * *